US006655740B1

(12) United States Patent
Hanagan

(10) Patent No.: US 6,655,740 B1
(45) Date of Patent: Dec. 2, 2003

(54) MOTORCYCLE BACKREST

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/304,213

(22) Filed: Nov. 26, 2002

(51) Int. Cl.[7] ................................................ A47C 15/00

(52) U.S. Cl. ............. 297/352; 297/195.12; 297/354.12; 297/452.29

(58) Field of Search .............................. 297/203, 195.1, 297/195.12, 215.11, 215.1, 215.12, 452.29, 243, 352, 378.1, 376, 397, 402, 408, 391, 354.12, 183.1, 183.6, 183.7, 183.4, 183.9; 280/293, 288.4, 304.3, 304.5

(56) References Cited

U.S. PATENT DOCUMENTS

| | | | | |
|---|---|---|---|---|
| 1,961,145 | A | | 6/1934 | Harley |
| 4,103,858 | A | | 8/1978 | Swenson |
| 4,111,448 | A | | 9/1978 | Sklowsky |
| 4,313,639 | A | | 2/1982 | Ware |
| 4,363,516 | A | | 12/1982 | Braly |
| D271,866 | S | | 12/1983 | Turkington |
| 4,466,660 | A | * | 8/1984 | Mabie |
| 4,570,998 | A | | 2/1986 | Hughes |
| 4,596,422 | A | | 6/1986 | Stahel |
| 4,679,647 | A | | 7/1987 | Komuro |
| D301,409 | S | | 6/1989 | Beckett |
| 4,953,911 | A | | 9/1990 | Hanagan |
| 5,026,119 | A | | 6/1991 | Frank et al. |
| 5,054,855 | A | * | 10/1991 | Williams et al. |
| 5,468,052 | A | * | 11/1995 | Vaughn |
| 5,544,937 | A | | 8/1996 | Hanagan |
| 5,608,957 | A | | 3/1997 | Hanagan |
| 5,667,232 | A | | 9/1997 | Gogan |
| 5,779,303 | A | | 7/1998 | Kuelbs |
| 5,997,088 | A | | 12/1999 | Stark et al. |
| 6,007,150 | A | | 12/1999 | Clerkin |
| D422,421 | S | | 4/2000 | Hoagland |
| 6,068,334 | A | | 5/2000 | Bonfilio |
| 6,135,473 | A | * | 10/2000 | Wright |
| 6,164,725 | A | | 12/2000 | Cruz |
| 6,224,081 | B1 | | 5/2001 | Wayman |
| 6,422,648 | B1 | * | 7/2002 | Hanagan |

* cited by examiner

*Primary Examiner*—Milton Nelson, Jr.

(57) ABSTRACT

A motorcycle backrest has a back support cushion with a handhold aperture, and a support arm mounting for mounting the back support cushion on the motorcycle saddle or frame. The backrest can simultaneously function as a comfortable back support for the driver and a convenient handhold for the passenger.

19 Claims, 6 Drawing Sheets

12
10
14
62
63

MOTORCYCLE BACKREST

BACKGROUND OF THE INVENTION

The present invention is directed to motorcycles, and, more particularly, to backrests for the driver and/or passenger.

Backrests are included on some motorcycle saddles for the comfort of the driver and/or passenger. Typically, the backrests include a cushion that is mounted on a rigid post which in turn is supported on the saddle or on the frame. It is desirable for a passenger backrest to be removable or folded down when it is not in use in order to optimize the aerodynamics of the vehicle.

Tandem motorcycle saddles are used for touring and not only include a passenger backrest, but also may include handholds positioned on the left and right sides of the passenger seat. Typically, such handholds are formed from metal bars, and may not be particularly comfortable for the user.

It is an object of the present invention to provide a novel motorcycle backrest which is attractive and comfortable.

It is also an object to provide a novel driver backrest which includes a passenger handhold and which has minimal impact upon the aerodynamics of the vehicle.

Another object is to provide a motorcycle seat backrest that can be conveniently used to secure cargo.

SUMMARY OF THE INVENTION

It has now been found that the foregoing and related objects may be readily attained in a motorcycle backrest comprising a back support cushion having an aperture extending therethrough and providing a peripheral portion extending thereabout. Mounting means for mounting the back support cushion on a motorcycle includes a support post having the back support cushion secured to the upper end thereof and having a lower end adapted to be mounted on the motorcycle.

The aperture is positioned in the center of the back support cushion, and the aperture is dimensioned to receive the fingers of at least one hand of a passenger seated therebehind. Preferably, the peripheral portion and aperture are dimensioned to enable gripping of the peripheral portion by at least one hand of the passenger seated therebehind.

The back support cushion has a curvilinear perimeter, and the back support cushion includes a frame with cushioning material on at least the front face thereof. The back support cushion also desirably includes a face plate on its rear face which is secured to the frame.

The mounting means desirably includes angle adjustment means for adjusting the angle of the back support cushion relative to the support post, and this preferably includes pivot means between the frame and the post. The plate also has a aperture therein which provides access to the pivot means.

The backrest is used in combination with a motorcycle tandem saddle providing a driver seat portion and a passenger seat portion, and the backrest is mounted on the saddle between the passenger and driver seat portions.

DETAILED DESCRIPTION OF THE PREFERRED EMBODIMENT

Figure 1:
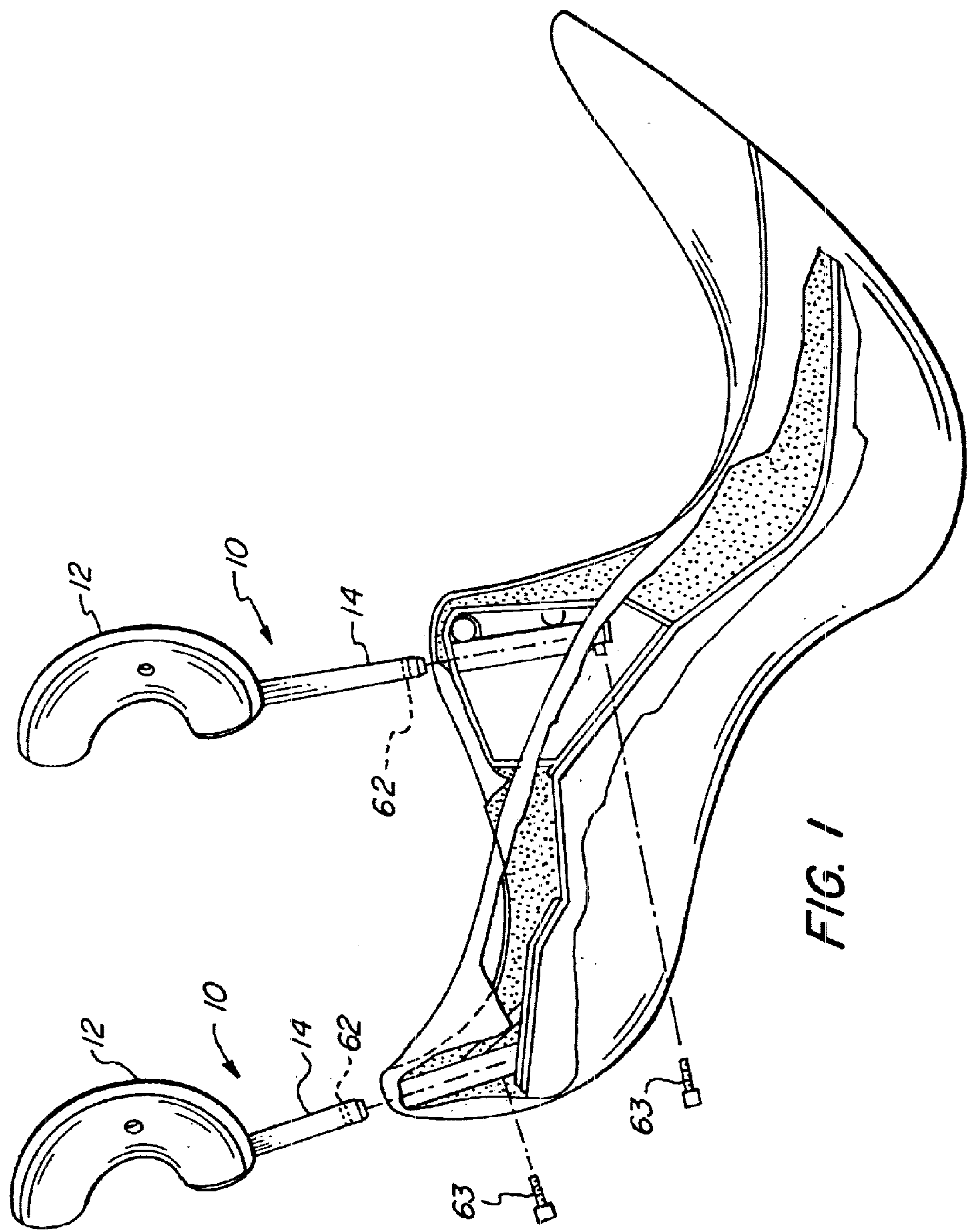
FIG. 1 is a partially exploded sectional view of a tandem motorcycle saddle showing driver and passenger backrests embodying the present invention.
Figure 2:
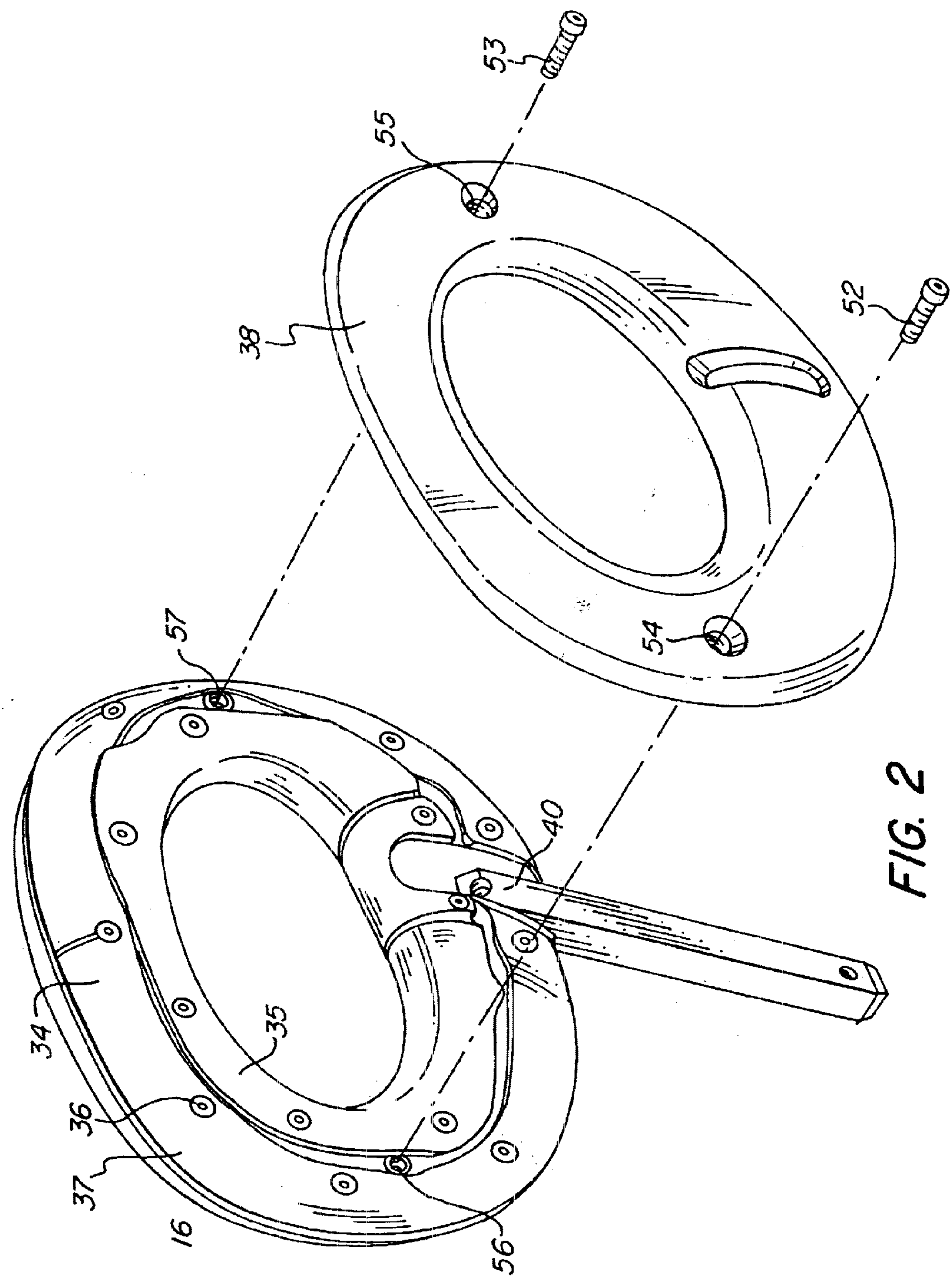
FIG. 2 is a rear perspective view of a backrest of FIG. 1 with the finishing plate removed.

FIG. 1 illustrates a tandem motorcycle saddle generally designated by the numeral 60 with driver and passenger seat portions 66, 68, respectively, and driver and passenger backrests **10*a*, 10*b* each having support arms 14 which seat in receptacles 70, 72 secured to the platform 74 of the saddle. The bolts 63 extend through the receptacles 70, 72 and through passages 62 in the arm 14 to releasably secure the backrests 10** in assembly with the saddle.

As is shown in FIGS. 2–5, the cushion 12 includes an oval frame 16 disposed therewithin. A metal mounting assembly 18 is mounted on the frame 16 and includes a bracket 20 with a central wall 21 and rearwardly extending side walls 22, 23 which define a channel 24 with a rectangular cross section for receiving the support arm 14. The side walls 22, 23 have aligned apertures 25, 26 therein.

A pair of upwardly and outwardly extending rods 27, 28 have their inner ends mounted by welding or the like an opposite sides of the bracket 20 and are centrally supported by rigid arms 29, 30 which are integrally formed with bracket 20 and extend outwardly at the top of the bracket 20. Plates 31, 33 are welded to rods 27, 28, respectively and extend slightly upwardly therefrom. This configuration provides durability and strength to the connection between the frame 16 and the mounting assembly 18 by providing a substantial length of metal to be embedded or encapsulated in the molded frame 16, i.e., the entire length of rods 27, 28. As a result, the frame 16 can be constructed with a thickness that is about the same as the thickness of the bracket 20 while being sufficiently durable to withstand prolonged use.

A foam cushion 32 is molded over the front and edges of the frame 16 to provide support and comfort, and a pliable cover 34 formed from vinyl, leather, polyurethane, or other suitable covering material is placed over the foam cushion 32 and is fastened to the back of the frame 16 with rivets 36 or the like. A finishing plate 38 made of plastic, metal or other suitable material is mounted on the rear side of the frame. The finishing plate 38 covers the inner skirt portion 35 and outer skirt portion 37 of the cover 34 as well as the rivets 36 that hold the cover 34 in place, and it provides an aesthetically pleasing appearance. The plate 38 is mounted using bolts 52, 53 which extend through apertures 54, 55 in the finishing plate 38 and seat in the threaded bores 56, 57 in the rear side of the frame 16.

Figure 3:
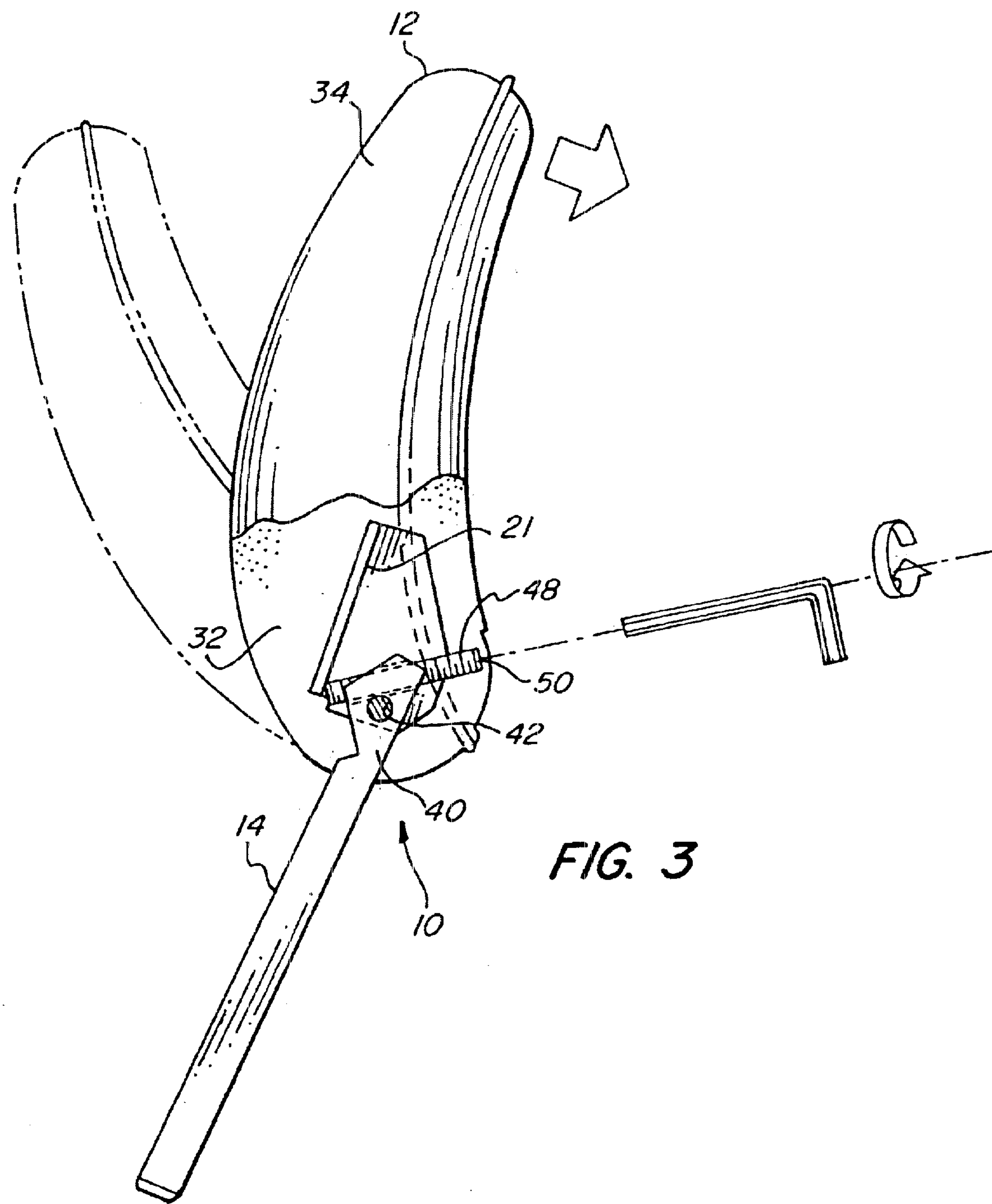
FIG. 3 is a side elevational view in partial section of the backrest showing the pivot mechanism and showing the back support cushion in full line in one position and in phantom line in an alternate position.
Figure 5:
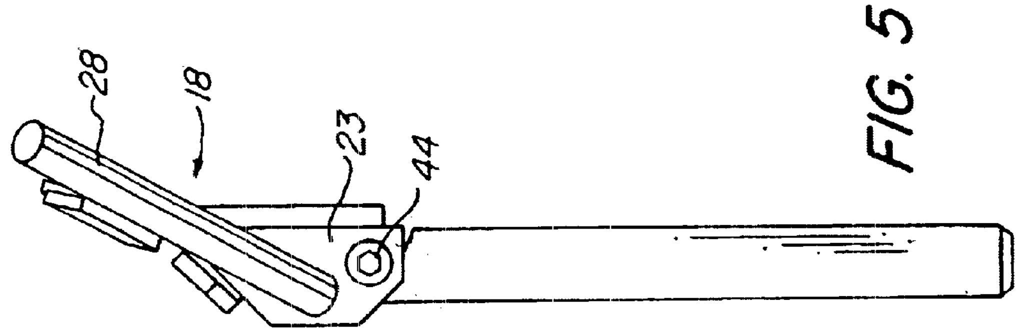
FIG. 5 is a side elevational view of the mounting assembly.
Figure 4:
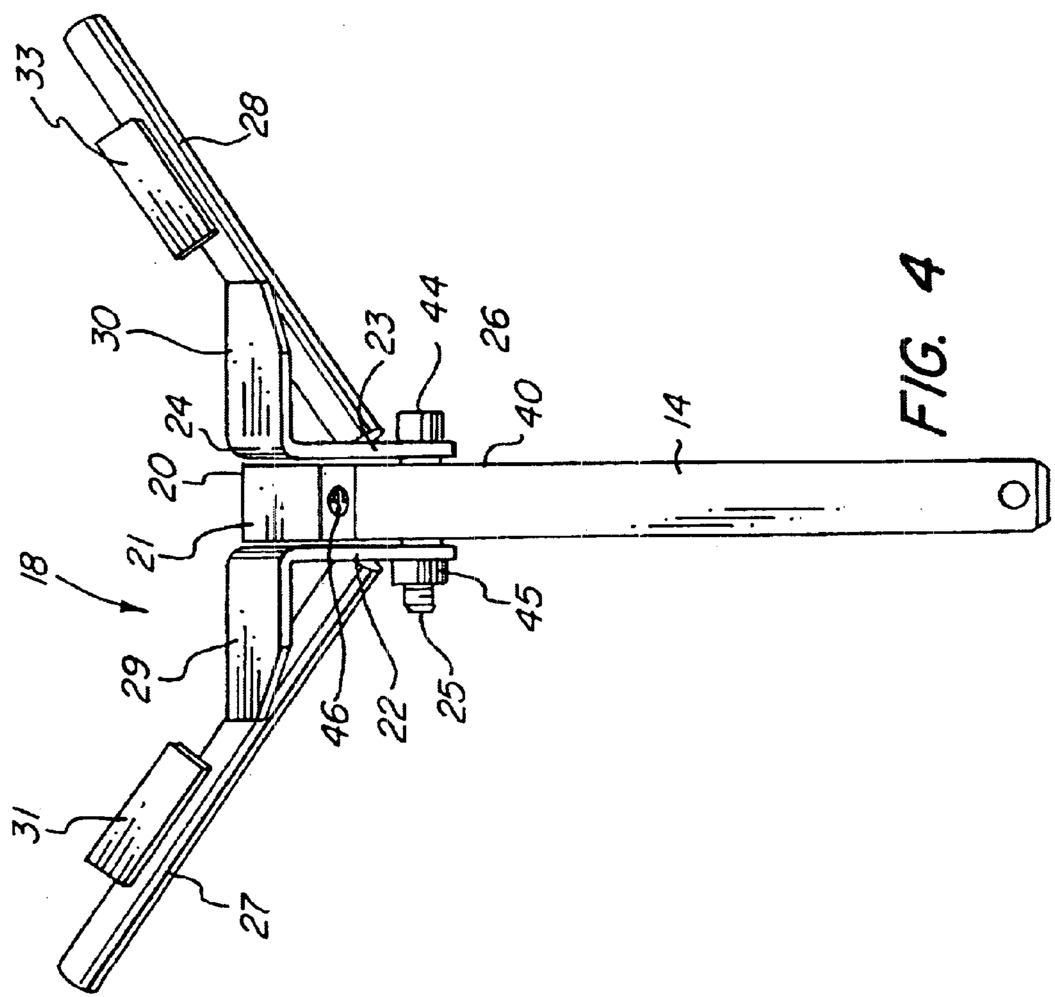
FIG. 4 is a rear view of the frame and mounting assembly embedded within the backrest cushion.
Figure 6:
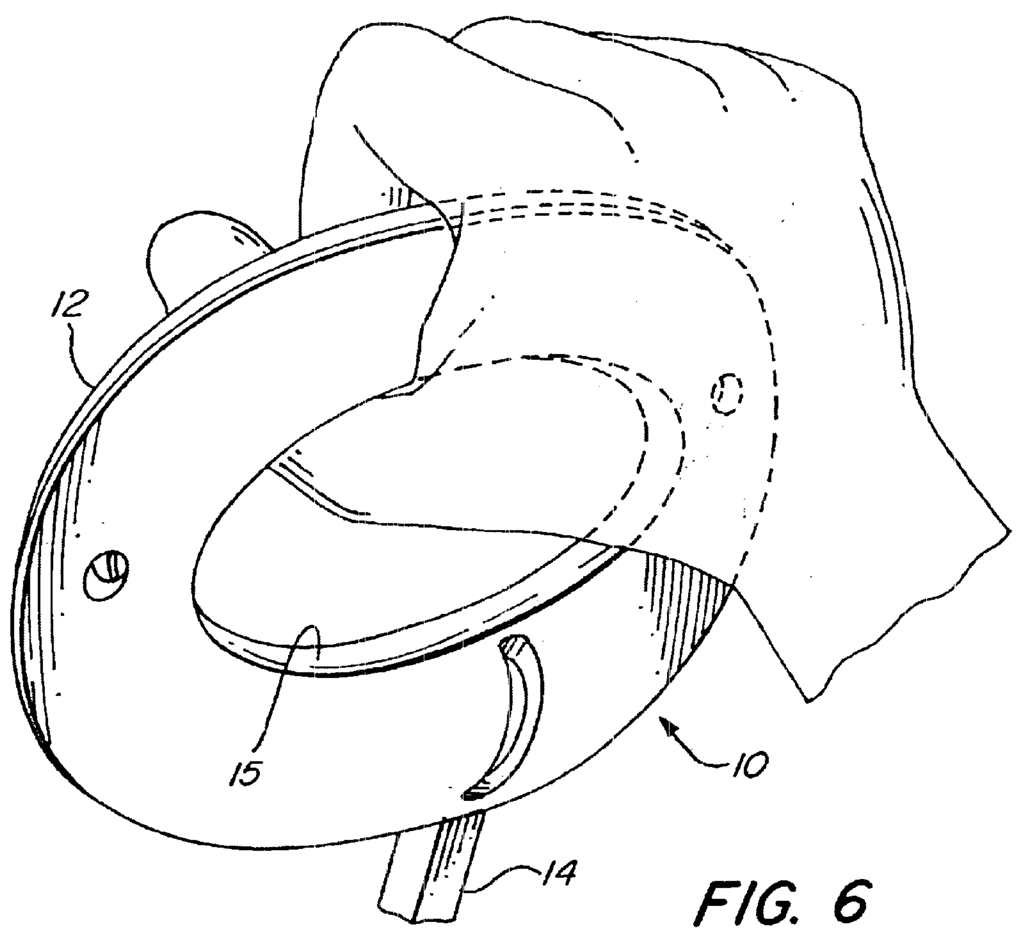
FIG. 6 is a rear perspective view of the driver backrest showing its use by a passenger as a hand grip.

FIGS. 3–5 illustrate the mechanism for pivoting the backrest 10 relative to the support arm 14. The upper end 40 of the support arm 14 has a bore 42 extending transversely therethrough and a pivot bolt 44 extends through the bore 42 and through apertures 25, 26 in the bracket 20 to pivotally mount the support frame 16 on the support arm 14. Nut 45 retains the bolt 44 in position.

The support arm 14 has a second bore 46 extending through the upper end 40 in a direction generally perpendicularly to the pivot bolt 44 therebelow. A set screw 48 extends through the second bore 46 and abuts the central wall 21 of the bracket 20. Rotation of the set screw 48 within the bore 46 permits adjustment of the exposed length of the shank and thus an adjustable limitation of the pivoting of the cushion 12 on the support arm 14 in a rearward direction. The head 50 of the set screw 48 is located within the slot 24 in order to provide convenient access for adjusting the cushion 12 using an Allen wrench.

Figure 7:
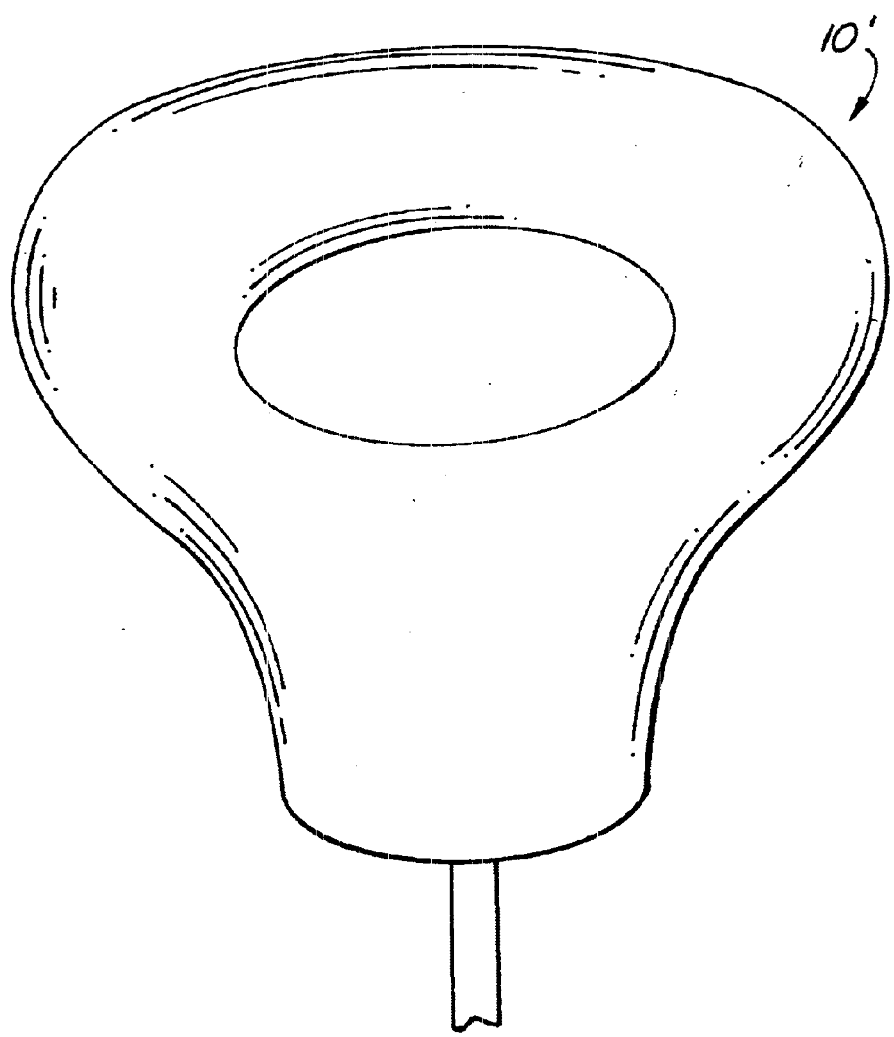
FIG. 7 is a front view of a second embodiment of a backrest embodying the invention.

FIG. 7 shows a backrest 10' with a slightly different contour. The backrest 10' has an upside-down teardrop shape which provides additional legroom for a passenger when the backrest is used for the driver portion seat of a tandem saddle with a small passenger's seat portion. The backrest may also have other configurations such as circular and ovate.

The back support cushion 12 is ergonomically configured to be gripped from behind by a passenger as is shown in FIG. 1. The cushion 12 has a large central aperture 15 and a peripheral portion which are configured for receiving the passenger's thumb from the rear side and the passenger's fingers from the front side. In the illustrated embodiment, the back support cushion 12 typically has the oval shape with a height of about 6–14 inches, a width of about 7–14 inches, and a thickness of about ¾–3 inches, and the upper end is thinner than the lower end. The central aperture 15 has a height of about 2–7 inches and a width of about 2–1/2–8 inches. The height and width of the central aperture 15 typically are each about 30–60% of the overall height and width of the support cushion 12, and preferably, 35–55%.

Thus, it can be seen from the foregoing detailed specification and attached drawings that the motorcycle backrest of the present invention provides a convenient and safe configuration for a passenger handhold while simultaneously providing comfort and support to the driver. Use of metal reinforcing rods and/or plates within the fiberglass frame enable the backrest to be sturdy. Inclusion of angle adjustment means and height adjustment means for the back support cushion maximizes the comfort of the user.

The use of a finish plate on the rear surface contributes to durability and gives the motorcycle an aesthetically pleasing look since it may be provided with a color coordinated with that of the motorcycle. The aperture in the backrest provides comfort to the user in hot weather by increasing air circulation around the user's back. When mounted in the passenger position, the backrest is a convenient structure for securing a package with bungee cords or the like. The backrest can be readily removed when not needed and subsequently can be conveniently reinstalled.

What is claimed is:

1. A motorcycle backrest comprising (a) a back support cushion having an aperture extending therethrough and providing a peripheral portion extending thereabout; and (b) mounting means for mounting said back support cushion on a motorcycle including a support post having said back support cushion secured to the upper end thereof and having a lower end adapted to be mounted on a motorcycle, said aperture in said back support cushion enabling flow of air therethrough as well as enabling a passenger to manually grip the periphery of said cushion about said aperture.

2. The motorcycle backrest in accordance with claim 1 wherein said aperture is positioned in the center of said back support cushion.

3. The motorcycle backrest in accordance with claim 1 wherein said backrest is adapted to be mounted on a tandem motorcycle with a front portion for a driver and a rear portion for a passenger and said mounting means mounts the backrest on said saddle forwardly of said rear portion, said aperture is dimensioned to receive the fingers of at least one hand of a passenger seated therebehind.

4. The motorcycle backrest in accordance with claim 1 wherein said peripheral portion and aperture are dimensioned to enable gripping of said peripheral portion by at least one hand of the passenger seated therebehind.

5. The motorcycle backrest in accordance with claim 1 wherein said back support cushion has a curvilinear perimeter.

6. The motorcycle backrest in accordance with claim 1 wherein said mounting means includes angle adjustment means for adjusting the angle of said back support cushion relative to said support post.

7. The motorcycle backrest in accordance with claim 1 wherein said back support cushion includes a frame with cushioning material on at least the front face thereof.

8. The motorcycle backrest in accordance with claim 7 wherein said back support cushion includes a protective plate on its rear face secured to said frame.

9. The motorcycle backrest in accordance with claim 7 wherein said mounting means includes angle adjustment means for adjusting the angle of said frame relative to said post.

10. The motorcycle backrest in accordance with claim 9 wherein said angle adjustment means includes pivot means between said frame and said post.

11. A motorcycle saddle and backrest comprising:

(a) a tandem saddle with a driver seat portion and a passenger seat portion;

(b) a back support cushion having an aperture extending therethrough and providing a peripheral portion extending thereabout, said back support cushion including a frame with cushioning material on at least the forward face thereof, and a protective plate on its rear face secured to said frame; and (c) mounting means for mounting said back support cushion on said saddle between said driver and passenger seat portions including a support post having said back support cushion secured to the upper end thereof and having a lower end mounted in the saddle, said mounting means including angle adjustment means providing pivot means between said frame and said post, and said plate having an aperture therein which provides access to said pivot means, said aperture in said back support cushion enabling flow of air therethrough as well as enabling a passenger to manually grip the periphery of said cushion about said aperture.

12. A motorcycle saddle and backrest comprising:

(a) a tandem saddle with a driver seat portion and a passenger seat portion;

(b) a back support cushion having an aperture extending therethrough and providing a peripheral portion extending thereabout; and (c) mounting means for mounting said back support cushion on said saddle between said driver and passenger seat portions including a support post having said back support cushion secured to the upper end thereof and having a lower end mounted in the saddle, said aperture in said back support cushion enabling flow of air therethrough as well as enabling a passenger to manually grip the periphery of said cushion about said aperture.

13. The motorcycle saddle and backrest in accordance with claim 12 wherein said aperture is positioned in the center of said,back support cushion.

14. The motorcycle saddle and backrest in accordance with claim 12 wherein said peripheral portion and aperture are dimensioned to enable gripping of said peripheral portion by at least one hand of the passenger.

15. The motorcycle saddle and backrest in accordance with claim 12 wherein said back support cushion includes a frame with cushioning material on at least the forward face thereof.

16. The motorcycle saddle and backrest in accordance with claim 15 wherein said back support cushion includes a protective plate on its rear face secured to said frame.

17. The motorcycle saddle and backrest in accordance with claim 16 wherein there is included angle adjustment means providing pivot means between said frame and said post, and wherein said plate has a aperture therein which provides access to said pivot means.

18. A motorcycle backrest comprising (a) a back support cushion having an aperture extending therethrough and providing a peripheral portion extending thereabout, said back support cushion includes a frame with cushioning material on at least the front face thereof; and (b) mounting means for mounting said back support cushion on a motorcycle including a support post having said back support cushion secured to the upper end thereof and having a lower end adapted to be mounted on a motorcycle, said aperture in said back support cushion enabling flow of air therethrough as well as manual gripping of the periphery of said cushion about said aperture, said mounting means including angle adjustment means for adjusting the angle of said frame relative to said post, and said angle adjustment means includes pivot means between said frame and said post.

19. The motorcycle backrest in accordance with claim 18 wherein said back support cushion includes a protective plate on its rear face secured to said frame and said plate has a aperture therein which provides access to said pivot means.

* * * * *